Feb. 2, 1943. C. H. DOCKSON ET AL 2,309,832
GOGGLES
Filed Aug. 17, 1938 2 Sheets-Sheet 2
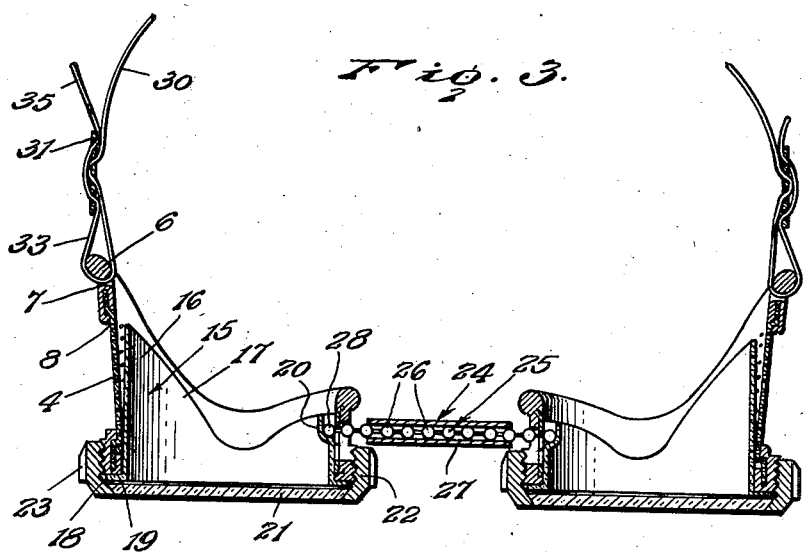
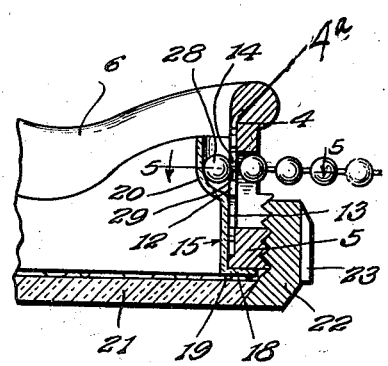
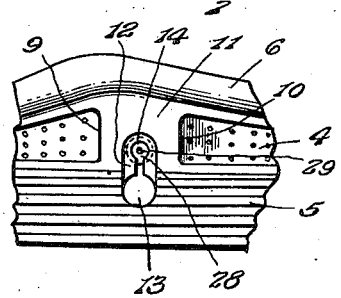
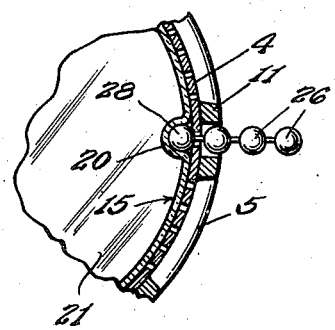
Inventors
Charles H. Dockson.
Harold S. Davis.
By Lacey & Lacey
Attorneys Patented Feb. 2, 1943

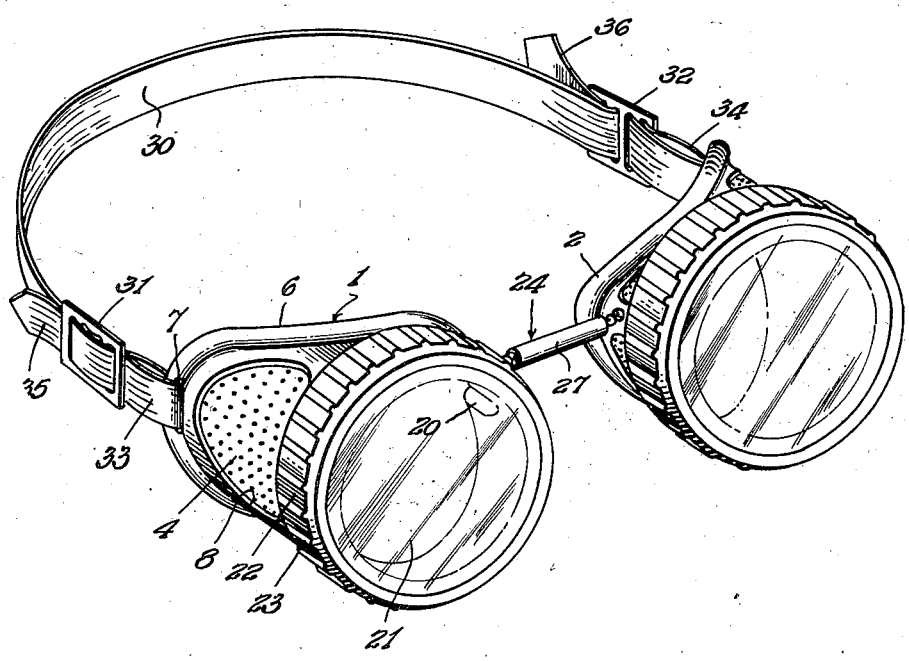
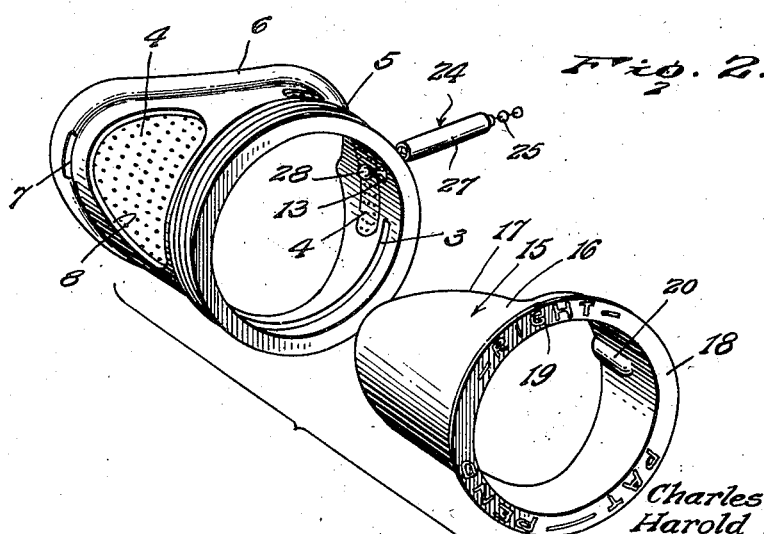

2,309,832

UNITED STATES PATENT OFFICE 2,309,832

GOGGLES

Charles H. Dockson and Harold S. Davis,
Detroit, Mich.

Application August 17, 1938, Serial No. 225,478

4 Claims. (Cl. 2—14)

This invention relates to improved goggles and seeks, among other objects, to provide a device of this character embodying shells, said shells comprising metal skeletons covered with a thermo-plastic material so that strong light-weight goggles will be produced.

Another object of the invention is to provide goggles wherein the thermo-plastic material will impart to the shells semi-resilience so that they will be capable of absorbing a portion of shock to the lenses of the goggles caused by flying particles or projectiles.

A further object of the invention is to provide goggles employing baffle shields for preventing injurious light rays and particles of dust or other foreign matter from reaching the eyes of the user but, at the same time, allowing an unusually large volume of air to enter the interior of the shells to circulate therein so that fogging of the lenses will not take place.

Another object of the invention is to provide goggles employing a novel and highly efficient nose bridge for connecting the shells or cups of the goggles.

Still another object of the invention is to provide effective means for removably securing the opposite ends of the nose bridge in the shells.

As a further object the invention seeks to provide goggles employing a head band of novel construction.

And the invention seeks as a still further object to provide a device of the character mentioned wherein the nose bridge comprises a flexible chain with a sleeve thereon, said chain having the end balls thereof engaged in slots formed in the shells in such a manner that said balls will be engaged by the baffle shields so that said balls will be limited against displacement.

Other and incidental objects of the invention not specifically mentioned heretofore will become apparent during the course of the following description.

In the accompanying drawings forming a part of our application:

Figure 1 is a perspective view of the complete goggles.

Figure 2 is a detail perspective view of one of the shells of the goggles and showing one of the baffle shields as it would appear in position to be inserted within the shell.

Figure 3 is a horizontal sectional view of the goggles.

Figure 4 is an enlarged detail horizontal sectional view showing particularly the mounting of the various components and showing how the baffle shield aids in retaining the ball of the nose bridge in position in the slot provided therefor.

Figure 5 is a detail sectional view on the line 5—5 of Figure 4, looking in the direction indicated in the arrows.

Figure 6 is a fragmentary plan view showing particularly the location and formation of the nose bridge chain receiving slot.

Referring now more particularly to the drawings, wherein similar reference numerals will be seen to designate like parts throughout the various views, the numerals 1 and 2 indicate the shells or cups of our improved goggles. The shells are right and left shells; that is to say, shells adapted to fit about the right and left eyes respectively, of the user. The shells are of identical construction and formation and it is therefore, thought that a description of one will suffice for both.

A typical shell constructed in accordance with our invention comprises, as best seen in Figures 2 and 4 of the drawings, a ring 3 formed of aluminum or other suitable light weight metal. The ring forms the base of a skeleton and has secured thereto a body 4 formed from light weight foraminous material. The body and ring, forming the skeleton, have molded thereon a coating of thermo-plastic material so that the completed shell or cup assumes the appearance disclosed in Figure 2 of the drawings. During the molding operation, the thermo-plastic material will flow through the openings in the foraminous shell and will, therefore, firmly adhere thereto. As shown at 4a in Figure 4, the edges of the skeleton are turned to form a reenforcing bead so that the skeleton will be afforded maximum rigidity. In other words, the shell is formed with an externally threaded outer end portion 5 and an inner bead 6 which is shaped to conform to the outline of the area of the human face about the eye. A head band attaching slot is shown at 7. The coating of thermo-plastic material is cut away at 8 to expose the foraminous body and permit the free flow of air through the openings in said body to the interior of the shell. The thermo-plastic material is also cut away at 9 and 10 to define a web 11, and formed in the web, medially of its length, and extending from substantially the midpoint of the externally threaded portion 5 to substantially the midpoint of the length of the web is a slot 12. The slot 12 is formed at one end with an enlarged circular opening 13 and at its opposite end said slot is formed with a relatively small circular opening 14, said slot communicating with both of said openings 13 and 14. The purpose of the slot 12 and the openings 13 and 14 will be described more in detail hereinafter.

Removably mounted in the shell 1 are baffle shields indicated generally at 15. As in the instance of the shells above described, the shields are of identical construction, one of said shields being for use with the right shell and the other with the left shell, so that a description of one will suffice for both. A baffle shield is formed of Celluloid or other suitable material and is extremely light in weight. The baffle shield is formed with a body 16 which has a rear edge 17 of the same general configuration as the shell 1 so as to follow generally the outline thereof. As seen in Figures 3 and 4 of the drawings, however, the edge 17 of the baffle shield 15 is located well within the shell so as not to interfere with the proper fitting of the shell about the eye. At its forward end, the body 16 of the baffle shield is formed with a right angularly disposed securing flange 18 having indicia 19 struck up along its circumference. The baffle shield is further provided with an indented portion 20, the purpose of which will be described hereinafter. The baffle shield 15 is mounted in the shell 1 and assumes the position shown in Figure 3 of the drawings; that is to say, the walls of the shell 1 taper away from the wall of the body 16 of the baffle shield so as not to obstruct the openings in the body, particularly at the cut away portion 8. The baffle shield, therefore, does not interfere with the circulation of air within the cup or shell 1 but serves effectually to prevent injurious light beams and particles of foreign matter from reaching the eye. The baffle shield is held in place in the shell by means of the lens 21 which lens is carried within a ring 22, which ring is screwed upon the externally threaded portion 5 of said shell. The ring 22 is ribbed on its outer surface, as shown at 23, so that ready manual engagement may be had with said ring when installing or removing the ring and lens from the shell. Attention is particularly directed to Figure 4 of the drawings, wherein, as will be seen, the indicia 19 is engaged by the inner surface of the margin of the lens 21 so that a slightly resilient mounting for the lens will be provided. That is, said indicia will aid in absorbing any shock to the lens so that likelihood of breaking of the lens by a flying particle will be reduced to a minimum.

In order to connect the shells 1 and 2, we provide a nose bridge 24 which includes a chain 25 made up of a plurality of connected balls 26. A sleeve 27, of fabric material, surrounds the chain 25 throughout the major portion of its length. The end ball on each end of the chain 25 is inserted through the opening 13 in the respective shells, it being understood that the lenses, baffle shields, and locking rings have been removed from the respective shells. After the end ball, shown at 28, has been inserted through the slot 12 in the web 11 of the shell 1, the link 29 which connects said ball 28 with its associated balls is shifted through the slot 12 into the opening 14. The ball 28 will then seat itself in said opening 14. Inasmuch as said opening 14 is of less diameter than the opening 13, said ball will be prevented from escaping. The ball 28 will seat itself on the circular edge of the opening 14 and will, therefore, not tend to shift toward the opening 13. After the ball 28 has been mounted in position and the ball on the opposite end of the chain installed in the shell 2 in a similar manner, the baffle shields are replaced. The baffle shield 15, for example, is placed in the shell 1 with the indented portion 20 fitting about the ball 28. The portion of the body 16 inwardly of the indented portion 20 covers the opening 13 and, therefore, serves effectually to prevent the ball 28 from slipping toward said opening. After the shields have been replaced, the lenses 21 are placed in the locking rings 22 and said locking rings are screwed on the portions 5 to assume operative position. The inner portion of the locking ring 22 also overlies the opening 13 so that the end portions of the chain are prevented from slipping forwardly. The nose bridge employed is particularly efficient for the reason that it permits the goggles to assume a very comfortable position on the nose of the wearer. Moreover, when the goggles are not being worn, the nose bridge construction allows the shells of said goggles to move freely with respect to each other so that they may be very conveniently carried about.

As best seen in Figures 1 and 3 of the drawings, the goggles are provided with a head band which is indicated in general by the numeral 30. As will be seen, the head band is formed from a single strip of material which material is preferably elastic. Buckles 31 and 32 are carried on the opposite end portions of the head band. As seen at 33, one end portion of the head band is passed through the slot 7 and is looped through the buckle 31. The opposite end of the head band is looped, as shown at 34 and, after passing through the connecting slot in the shell 2, is passed through the buckle 32. The effective length of the head band may be extended or reduced by merely pulling the free ends 35 and 36 through the loops 31 and 32 respectively, until the desired length has been attained.

Attention is directed to the fact that although we have shown the ring 3, said ring may be dispensed with, if desired, and the body 4 bent laterally to provide sufficient anchoring means for said body and the thermo-plastic material. Attention is further directed to the fact that the baffle shields can be made either from opaque or transparent material. Moreover, these shields are preferably made of plastic material and are, therefore, light in weight and require no metal parts or tools to install them. It is particularly pointed out that the baffle shields serve, in addition to their shielding function, to prevent displacement of the end balls of the chain 25 of the nose bridge structure.

It is also desired to point out that inasmuch as the balls 28 of the chain 25 are located within the indented portions 20 of the baffle shields 15, said balls will serve to locate the baffle shields properly in the shells 1 and 2.

It is believed that further description of our invention is unnecessary.

Having thus described the invention, what we claim is:

1. In goggles, a shell, a baffle shield removably mounted in the shell and having a flange, a lens, and a locking ring connecting the lens with the shell, said locking ring engaging the flange for clamping said baffle shield in operative position in the shell.

2. In goggles, shells having slots formed therein, a nose bridge connecting the shells and including a chain having end portions removably secured in the slots, baffle shields removably mounted in the shells, said baffle shields having indented portions receiving the end portions of the chain, said indented portions and end portions cooperating for locating the baffle shields in proper operative position, said baffle shields preventing displacement of the end portions of the chain, lenses and locking rings screwed on the shells and retaining the lenses and baffle shields in proper position on said shells.

3. In goggles, shells, means for connecting the shells with each other, baffle shields carried by the shells for excluding undesirable particles and light rays from the eyes, lenses, and means for connecting the lenses with the shells, said means clamping the baffle shields, shells and lenses as a unit, said baffle shields engaging said first-mentioned means and preventing accidental displacement of said means and said shells.

4. In goggles, shells, bodies associated therewith and having bayonet openings, chains swingingly connecting the shells with each other and having end portions removably engageable in the bayonet openings, baffle shields carried by the shells and having indented portions fitting about the ends of the chains for retaining said chains against accidental displacement from the bayonet openings, said baffle shields being removable for allowing removal of the ends of the chains from the bayonet openings, and means clamping the baffle shields in position in the bodies.

CHARLES H. DOCKSON
HAROLD S. DAVIS.